United States Patent
Wade

[19]

[11] Patent Number: 5,826,502
[45] Date of Patent: Oct. 27, 1998

[54] DEVICE FOR THE REMOVAL OF LIQUID FROM CANNED FOOD PRODUCTS

[76] Inventor: Bruce B. Wade, 3540 NW 35th Way, Lauderdale Lakes, Fla. 33309

[21] Appl. No.: 851,241

[22] Filed: May 5, 1997

[51] Int. Cl.$^6$ .................................................. B30B 7/00
[52] U.S. Cl. ............................ 100/234; D7/666; D7/687; 100/110
[58] Field of Search .................................... 100/110, 116, 100/125, 234, 243; D7/665, 666, 687; D8/52, 54

[56] References Cited

U.S. PATENT DOCUMENTS

| D. 157,874 | 3/1950 | Kolden | D7/687 |
|---|---|---|---|
| D. 298,297 | 11/1988 | Maltby | D7/687 |
| D. 311,116 | 10/1990 | Pentland | D7/666 |
| D. 379,139 | 5/1997 | Berde | D7/666 |
| 1,367,649 | 2/1921 | White | 100/234 |
| 1,432,754 | 10/1922 | Hollowell | 100/234 |
| 4,355,574 | 10/1982 | Bond et al. | 100/234 |
| 5,590,590 | 1/1997 | Zammit | 100/234 |

FOREIGN PATENT DOCUMENTS

| 68180 | 12/1948 | Denmark | 100/234 |
|---|---|---|---|
| 1035542 | 8/1953 | France | 100/234 |

*Primary Examiner*—Stephen F. Gerrity
*Attorney, Agent, or Firm*—M. K. Silverman

[57] ABSTRACT

A press-like device, for the forcing of canning liquid from solid food in a can of a type having a lid arranged to be severed to effect the opening of the can, includes a first member having a convex part and a concave part, a lower surface of the convex part including a gripping unit and an aperture at a free end of the concave part, the first member including a slot at a region of transition between the convex and concave parts. The device further includes a lid engagement element, the same inclusive of a magnet, the lid engagement element dependent from a free end of the concave part of the member. The device further includes a second member having a concave part and a convex part, the second member pivotally secured to the first member at a fulcrum point passing through the slot of the first member and passing through a region of transition within the second member between the concave and convex parts thereof, the convex part including, at a free end, elements for locking within the aperture of the free end of the convex part at selectable distances between the respective free ends of the respective parts of the first and second members. The device yet further includes a can base element integrally dependent from a free end of the concave part of the second member of the device, the base element disposed oppositely to the lid engagement element.

4 Claims, 1 Drawing Sheet

DEVICE FOR THE REMOVAL OF LIQUID FROM CANNED FOOD PRODUCTS

BACKGROUND OF THE INVENTION

The present invention relates to a manually operable press, intended for consumer and household usage, to assist in the removal of liquid from canned solid food products as, for example, cans of tuna which typically are provided in six ounce and twelve ounce cans. It is, however, to be appreciated that this invention may be used with any of a number of canned solid foods which are surrounded, within the can, by a liquid preservative or the like.

A further consideration, addressed by the instant invention is that many canned solid foods, such as tuna, are, by the general public, believed to be packed in water or oil, this meaning, to the typical consumer, that the canned food is simply surrounded by the liquid. However, it has been found that most of the liquid within a can containing such a solid food product is retained by the product itself. That is, such a canned product is, typically, highly permeable so that the removal of water or oil from such a canned food is not simply a matter of opening the can and pouring off the excess liquid. Rather, it is necessary to, in some fashion, squeeze the excess liquid out of the product after the ambient liquid has been removed.

In practice, most consumers accomplish the above steps by first opening the can, pouring out the visible excess liquid, and then pushing down on the severed lid of the can while the can is placed over the sink. In this process, the can is typically inverted to facilitate a more efficient draining of the water therein. It has been found, as is recognized in other prior art (see for example U.S. Pat. No. 5,372,063 (1994) to Berg, entitled Press for Forcing Liquid from Canned Solid Food) that the above procedure usually causes the thin lid of the can to bend which, resultingly, causes an uneven pressure against the food product. As such, a significant portion of the canning fluid, i.e., water, oil or suspension thereof including particles of the food with water and oil, will remain in the food product. This is a particular problem with persons having poor strength in the fingers to accomplish the above procedure. Further, such uneven pressure also causes the lid to bend which can be source of injury to the user. As well, the pressing of the preservative liquid from a can of canned solid food can impart undesirable odor to the fingers and hands of the user.

After the above has been accomplished, the removal of the lid of the can often presents a problem in and of itself, since the lid has been forced downward from its original position and into the internal diameter of the can. As such, the consumer is then confronted with another problem that may require the use of a screw driver to effect the removal of the lid from its surrounding can. Further, when the above occurs, particles of metal associated with the original opening or severing of the lid from the can can become embedded within the food product.

The prior art, in the instant area, as is best known to the inventor is reflected in U.S. Pat. No. 3,995,544 (1976) to Farley which is directed to a utensil defining a cup-shaped member that can fit within an open can and employs a perforated pressing wall portion that engages the contents of the can and squeezes the liquid therefrom through the perforations when the wall is forced into the can. The use of such a device is impractical for persons not having considerable manual dexterity.

The prior art is also reflected in the above-referenced U.S. Pat. No. 5,372,063 to Berg. This reference defines a complex device that is not cost-effective to manufacture and market and which, as in the case of said reference to Farley, requires a high degree of manual dexterity for the consumer to operate.

Other art in the instant area known to the inventor is U.S. Pat. No. 5,419,245 (1995) to Short, entitled Food Press Apparatus with Bias Press Plate. The reference to Short is one which was designed for institutional use, e.g., by restaurants, hotels and the like, in that it constitutes a large, bulky and expensive piece of machinery which is impractical for use in a domestic household.

The instant invention accordingly may be viewed as a response to the above long-felt need in the art for a device, for the removal of canned liquid from can food products, which is particularly suitable for use by the domestic consumer and which does not require any particularly degree of manual dexterity for the operation thereof.

SUMMARY OF THE INVENTION

The present invention relates to a press-like device for expelling canning liquid surrounding the solid food in a can of a type having a lid arranged to be severed to effect the opening of the can. The device includes a first member having a convex part and a concave part, a lower surface of said convex part including gripping means and an aperture at a free end thereof, said member including an elongate slot at a region of transition between said convex and concave parts. The device further includes lid engagement means, the same inclusive of magnet means, said lid means dependent from a free end of the concave part of said first member. The device further includes a second member having a concave part and a convex part, said second member pivotally secured to said first member at a fulcrum point passing through said slot of said first member and passing through a region of transition within said second member between said concave and convex parts thereof, said concave part including, at a free end thereof, means for locking said free end within said aperture of said free end of said convex part at selectable distances between the respective free ends of the respective parts of said first and second members. The inventive device yet further includes can base engagement means integrally dependent from a free end of said convex part of said second member of said device, said can base engagement means disposed oppositely to said lid engagement means.

It is accordingly an object of the invention to provide an improved device for the removal of canning liquid from canned food products.

Another object is to provide a device of the above type which enables pressing, with substantial force of a severed lid against the canned in a manner not requiring a special degree of manual dexterity or strength.

It is a further object to provide a device of the above type that utilizes magnet means as a part of a press element to effect retrieval of the severed lid after the pressing operation has been accomplished.

It is a yet further object to provide a device of the above type that eliminates contact of the hands of the user with the food product.

It is a still further object of the invention to provide a device of the above type which minimizes the possibility of implantation of metal particles from the edges of the severed lid into the food product.

The above and yet other objects and advantages of the present invention will become apparent from the hereinafter

DETAILED DESCRIPTION OF THE INVENTION

Figures 1, 2:
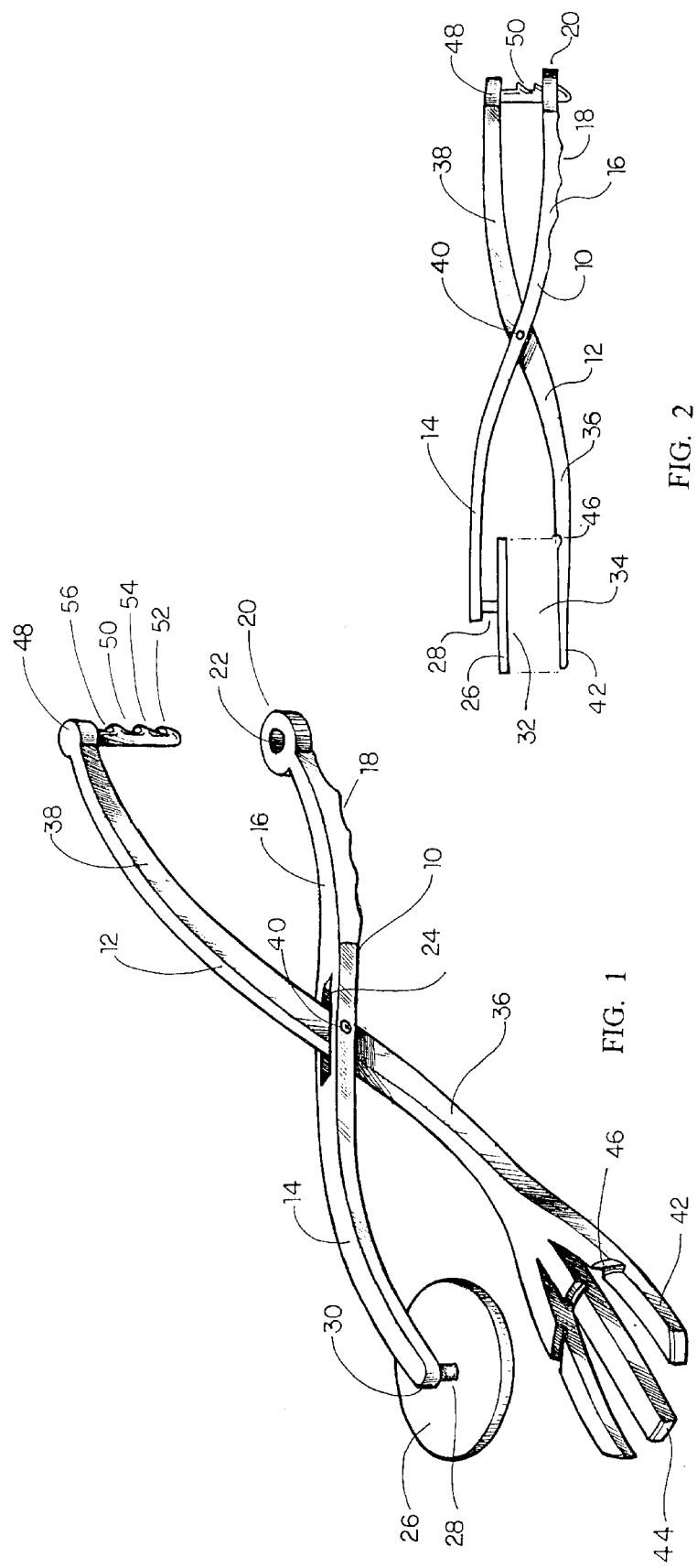
FIG. 1 is a perspective view of the instant device for the removal of liquid from can food products.
FIG. 2 is a side elevational view thereof showing in phantom a can to be used with the instant invention.

With reference to the views of FIGS. 1 and 2, the instant inventive device may be seen to include a first member 10 and a second member 12. Said first member includes a concave part 14 and a convex part 16 in which a lower surface of said concave part includes gripping means 18. As may be further noted, a free-end 20 of said convex part 16 of said first member 10 includes an aperture 22.

It is further noted that said first member 10 includes an elongate slot 24 located at a region of transition between said convex and concave parts 14 and 16 respectively.

As may be further noted in FIGS. 1 and 2, the inventive device further includes lid engagement means 26 which is dependent from concave part 14 of first member 10, through vertical member 28, and depends downwardly from end 30 of said concave part 14 of first member 10.

On the underside of lid engagement means 26 is provided magnet means 32, the function of which is to engage, secure and remove the lid of a can 34 (see FIG. 2) to be manipulated through the present device.

As may be further noted in the figures, said second member 12 includes a convex part 36 and a convex part 38 which may also be provided with gripping means. Said second member 12 is pivotally secured to first member 10 at a fulcrum pivot point 40. Accordingly, there is provided a double lever action in which each of the right hand parts of the respective members, that is, convex and convex parts 18 and 38 respectively provide a lever action relative to convex and concave parts 36 and 14 such that considerable pressure is exerted at free end 30 of first member 10 against can base engagement means 42 at the end of convex part 36 of second member 12.

As may be further noted in FIG. 1, said can base engagement means 42 includes, in a preferred embodiment of the invention, a plurality of fingers 44 upon which the can 34 to be opened can rest. Further, there is provided at least one circular discontinuous notch 46 upon which the lower edge of the can rest. It is to be appreciated, that can base engagement means 42 may be provided with more than the single non-continuous ridge 46 so that can having different curvatures (the same corresponding to different radii) may be secured within a notch of the type of notch 46. It is, further, to be appreciated that prongs 44 may take a variety of different shapes. Shown at end 48 of concave part 38 of second member 12 is a vertical member 50 which includes a plurality of serration which are proportioned for selectable interlock with the inside diameter of aperture 22 at end 20 of first member 10. That is, when the parts 16 and 38 of the present device are squeezed toward each other (see FIG. 2), the serrations on member 50 will engage the inside diameter of aperture 22 thereby providing a locking of the lid engagement means 26 against the lid (not shown) of can 34. Further, the lid engagement means 26 may be sequentially advanced toward can base engagement means 42 using serrations 52, 54 and 56. This precludes water or oil surrounding the canned food from squirting out from the annular region surrounding the severed lid since the lid will be pressed gradually into the canned product by virtue of the step wise advance which is created through the co-action of the serrations and aperture 22 in the instant device. That is, at the beginning of the liquid removal process, the device appears as is shown in FIG. 2. Therein, lowermost serration 52 (see FIG. 1) is engaged by aperture 22. However, when the parts 18 and 38 are further compressed toward each other, second serration 54 will engage the interior diameter of aperture 22 thereby further depressing lid engagement means 26 into can 34 thus beginning the process of expelling unwanted liquid surrounding the food product. As a final step, the parts 18 and 38 are squeezed together sufficiently to engage third serration 56 with the inside diameter of aperture 22. At that point, all ambient liquid has been removed and the food products itself has been substantially squeezed such that most of the fluid therein has also been expelled.

The use of magnet 32 on the lower surface of lid engagement means 36 assures that, after the above process is complete, and parts 18 and 38 have been pulled apart to the position shown in FIG. 1, that the lid of the can will be retained by lid engagement means 36.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described my invention what I claim as new, useful and accordingly secure by Letters Patent of the United States is:

1. A device for expelling liquid surrounding solid food in a can of a type having a lid arrange to be severed to effect the opening of the can, the device comprising:
   (a) a first member having a convex part and a concave part, said member including a slot at a region of transition between said convex and concave parts;
   (b) lid engagement means, including magnet means at a lower surface thereof, said lid engagement means dependent from a free end of said concave part of said first member;
   (c) a second member having a concave part and a convex part, said member pivotally secured to said first member at a fulcrum point passing through said slot of said first member at a region of transition of said second member between said concave and convex parts thereof; and
   (d) can base engagement means integrally dependent from a free end of said convex part of said second member opposite to said lid engagement means of said first member.

2. The device as recited in claim 1, in which a lower surface of said convex part of said first member includes gripping means.

3. The device as recited in claim 1, in which:
   said convex part of said first member includes an aperture at a free end thereof;
   said concave part of said first member includes, at a free end thereof, means for effecting various locking locations relative to an interior diameter of said aperture, enabling thereby control of the extent of displacement and compression between said lid engagement means of said first member and said can base engagement means of said second member, as said convex part of said first member and said concave part of said second member are manually pressed together.

4. The system as recited in claim 1, in which an upper surface of said concave part of said second member includes gripping means.

* * * * *